United States Patent
Fu et al.

(10) Patent No.: US 11,494,728 B2
(45) Date of Patent: *Nov. 8, 2022

(54) SYSTEMS AND METHODS FOR OPTIMIZING DELIVERY ROUTES USING FLEET VEHICLES AND THIRD-PARTY DELIVERERS

(71) Applicant: Walmart Apollo, LLC, Bentonville, AR (US)

(72) Inventors: Mingang Fu, Palo Alto, CA (US); Deepak Deshpande, San Jose, CA (US); Prakash Seetharaman, Santa Clara, CA (US); Devadas Pattathil, San Jose, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 102 days.

This patent is subject to a terminal disclaimer.

(21) Appl. No.: 16/827,059

(22) Filed: Mar. 23, 2020

(65) Prior Publication Data

US 2020/0226547 A1  Jul. 16, 2020

Related U.S. Application Data

(63) Continuation of application No. 15/370,020, filed on Dec. 6, 2016, now Pat. No. 10,600,021.

(51) Int. Cl.
*G06Q 10/08* (2012.01)
(52) U.S. Cl.
CPC .............................. *G06Q 10/08355* (2013.01)
(58) Field of Classification Search
CPC ............................................... G06Q 10/08355
See application file for complete search history.

(56) References Cited

U.S. PATENT DOCUMENTS

| 7,437,305 B1 | 10/2008 | Kantarjiev et al. |
| 2008/0140597 A1* | 6/2008 | Satir ................ G06Q 10/04 706/46 |

(Continued)

OTHER PUBLICATIONS

Czech, Z.J. and Czarnas, P., Parallel Simulated Annealing for the Vehicle Routing Problem with Time Windows, undated 2001.

*Primary Examiner* — Talia F Crawley
(74) *Attorney, Agent, or Firm* — Bryan Cave Leighton Paisner LLP

(57) ABSTRACT

Systems and methods including one or more processors and one or more non-transitory storage devices storing computing instructions configured to run on the one or more processors and perform: receiving a plurality of website orders on a website of an online retailer for delivery of a plurality of products; determining at least one fleet delivery route for delivery of the plurality of products of the plurality of website orders to a plurality of locations using a vehicle fleet of the online retailer; dynamically shuffling the at least one fleet delivery route, wherein dynamically shuffling the at least one fleet delivery route comprises: selecting a source route from the at least one fleet delivery route; selecting a first order of the plurality of web site orders from the source route, the first order scheduled to be delivered to a first location of the plurality of locations; selecting a destination route from (1) the at least one fleet delivery route and (2) one or more third-party delivery routes; evaluating a cost differential of removing the first order of the plurality of orders from the source route, as selected; and inserting the first order into a first third-party delivery route of the one or more third-party delivery routes when the cost differential of (1) removing the first order from the source route and (2) inserting the first order into the first third-party delivery route satisfies a predetermined cost differential level; and communicating the first order to a first third-party deliverer (Continued)

associated with the first third-party delivery route for delivery at the first location when the cost differential of (1) removing the first order from the source route and (2) inserting the first order into the first third-party delivery route satisfies the predetermined cost differential level. Additional embodiments are disclosed herein.

20 Claims, 6 Drawing Sheets

(56) References Cited

U.S. PATENT DOCUMENTS

| | | | |
|---|---|---|---|
| 2013/0073327 A1* | 3/2013 | Edelberg | G06Q 10/0631 |
| | | | 705/7.13 |
| 2014/0278635 A1 | 9/2014 | Fulton et al. | |
| 2015/0186869 A1 | 7/2015 | Winters et al. | |
| 2016/0300174 A1* | 10/2016 | Grichnik | G06Q 10/0637 |
| 2016/0300186 A1* | 10/2016 | Scharaswak | G06Q 10/0835 |
| 2017/0317780 A1* | 11/2017 | Wood | H04L 41/12 |
| 2018/0032955 A1* | 2/2018 | Lindawati | G06Q 10/06314 |
| 2018/0102964 A1* | 4/2018 | Kao | H04L 67/12 |

* cited by examiner

415

455 – Selecting a source route from the at least one fleet delivery route.

460 – Selecting a first node from the source route as selected with the random number generator.

465 – Selecting a destination route from the at least one fleet delivery route and one or more third-party delivery routes using the random number generator.

470 – Evaluating a cost differential of removing the first node from the source route and inserting the first node into a first third-party delivery route.

475 – Inserting the first node into the first third-party delivery route of the one or more third-party delivery routes.

FIG. 4B

SYSTEMS AND METHODS FOR OPTIMIZING DELIVERY ROUTES USING FLEET VEHICLES AND THIRD-PARTY DELIVERERS

CROSS-REFERENCE TO RELATED APPLICATIONS

This application is a continuation of application Ser. No. 15/370,020, filed Dec. 6, 2016, which is herein incorporated by this reference in its entirety.

TECHNICAL FIELD

This disclosure relates generally to optimizing delivery routes using fleet vehicles and third-party deliverers.

BACKGROUND

Delivery route optimization is rated as a class of problems in computational complexity theory that is non-deterministic polynomial (NP)-time hard, or at least as hard as the hardest problem in NP. In retail, conventional systems find a set of routes originating and terminating at a depot for delivery of products with a fleet of vehicles of a retailer. The customers have a given delivery demand and a vehicle in the fleet is constrained by a capacity of the vehicle. Thus, retailers are often limited by the availability and capacity of the fleet of vehicles for the retailer.

BRIEF DESCRIPTION OF THE DRAWINGS

To facilitate further description of the embodiments, the following drawings are provided in which:

FIGS. 4A-B are flowcharts for a method, according to certain embodiments.

Figure 1:
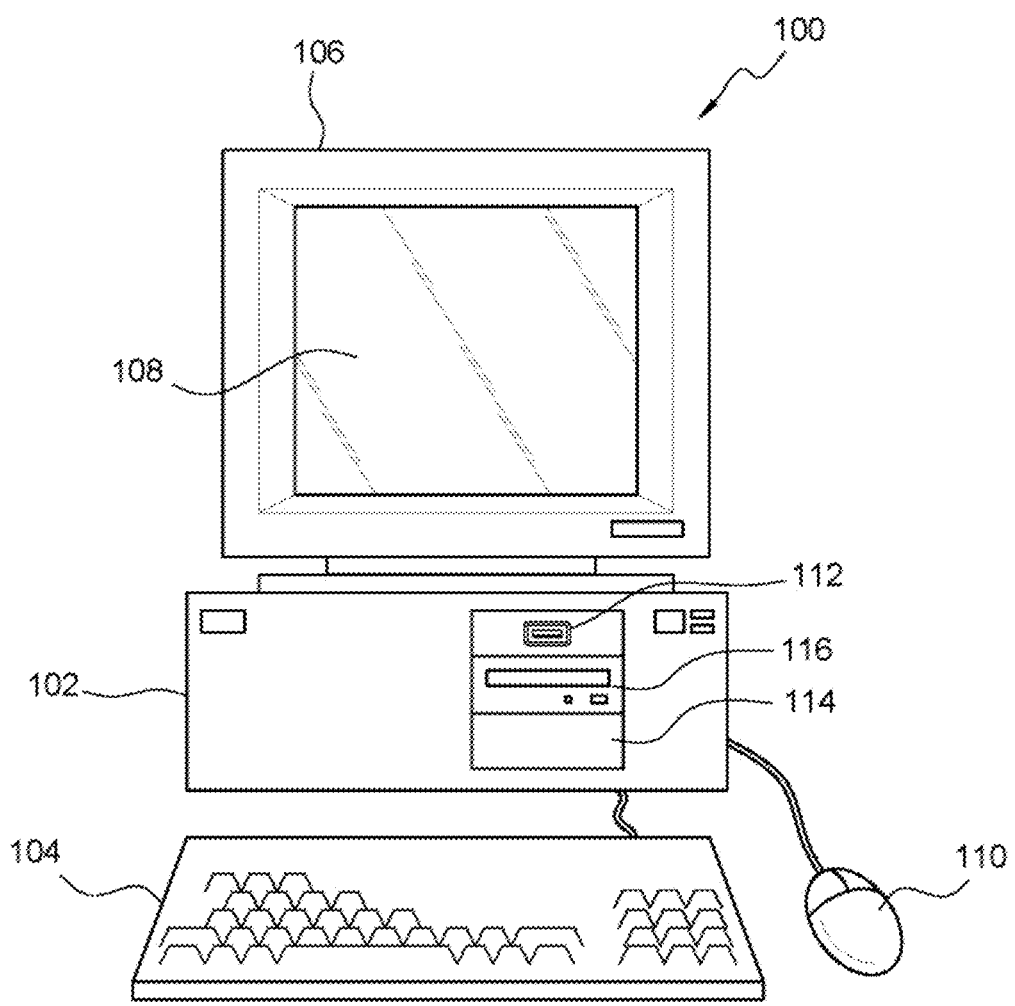
FIG. 1 illustrates a front elevational view of a computer system that is suitable for implementing various embodiments of the systems disclosed in FIGS. 3 and 5.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processors and one or more non-transitory computer-readable storage devices storing computing instructions. The computing instructions can be configured to run on the one or more processors and perform acts of receiving a plurality of website orders on a website of an online retailer for delivery of a plurality of products; determining at least one fleet delivery route for delivery of the plurality of products of the plurality of web site orders to a plurality of locations using a vehicle fleet of the online retailer; dynamically shuffling the at least one fleet delivery route, wherein dynamically shuffling the at least one fleet delivery route comprises: selecting a source route from the at least one fleet delivery route; selecting a first order of the plurality of website orders from the source route, the first order scheduled to be delivered to a first location of the plurality of locations; selecting a destination route from (1) the at least one fleet delivery route and (2) one or more third-party delivery routes; evaluating a cost differential of removing the first order of the plurality of orders from the source route, as selected; and inserting the first order into a first third-party delivery route of the one or more third-party delivery routes when the cost differential of (1) removing the first order from the source route and (2) inserting the first order into the first third-party delivery route satisfies a predetermined cost differential level; and communicating the first order to a first third-party deliverer associated with the first third-party delivery route for delivery at the first location when the cost differential of (1) removing the first order from the source route and (2) inserting the first order into the first third-party delivery route satisfies the predetermined cost differential level.

Various embodiments include a method. The method can be implemented via execution of computing instructions configured to run at one or more processors and configured to be stored at non-transitory computer-readable media The method can comprise receiving a plurality of web site orders on a web site of an online retailer for delivery of a plurality of products; determining at least one fleet delivery route for delivery of the plurality of products of the plurality of website orders to a plurality of locations using a vehicle fleet of the online retailer; dynamically shuffling the at least one fleet delivery route, wherein dynamically shuffling the at least one fleet delivery route comprises: selecting a source route from the at least one fleet delivery route; selecting a first order of the plurality of website orders from the source route, the first order scheduled to be delivered to a first location of the plurality of locations; selecting a destination route from (1) the at least one fleet delivery route and (2) one or more third-party delivery routes; evaluating a cost differential of removing the first order of the plurality of orders from the source route, as selected; and inserting the first order into a first third-party delivery route of the one or more third-party delivery routes when the cost differential of (1) removing the first order from the source route and (2) inserting the first order into the first third-party delivery route satisfies a predetermined cost differential level; and communicating the first order to a first third-party deliverer associated with the first third-party delivery route for delivery at the first location when the cost differential of (1) removing the first order from the source route and (2) inserting the first order into the first third-party delivery route satisfies the predetermined cost differential level.

A number of embodiments can include a system. The system can include one or more processing modules and one or more non-transitory storage modules storing computing instructions configured to run on the one or more processing modules. The one or more storage modules can be configured to run on the one or more processing modules and perform the act of receiving a plurality of website orders on a website of an online retailer for delivery of a plurality of products. The one or more storage modules also can be configured to run on the one or more processing modules and perform the act of determining at least one fleet delivery route for delivery of the plurality of products of the plurality of website orders to a plurality of locations using a vehicle fleet of the online retailer. The at least one fleet delivery route can comprise a plurality of nodes and each node of the plurality of nodes comprises a different location of the plurality of locations. The one or more storage modules also can be configured to run on the one or more processing modules and perform the act of performing a randomized node movement on the at least one fleet delivery route to optimize delivery of the plurality of products. Performing the randomized node movement can include selecting a source route from the at least one fleet delivery route using a random number generator. Performing the randomized node movement also can include selecting a first node of the plurality of nodes from the source route as selected with the random number generator, the first node being associated with a first order of the plurality of website orders at a first location of the plurality of locations. Performing the randomized node movement also can include selecting a destination route from the at least one fleet delivery route and one or more third-party delivery routes using the random number generator. Performing the randomized node movement also can include evaluating a cost differential of removing the first node from the source route as selected and inserting the first node into a first third-party delivery route of the one or more third-party delivery routes if the random number generator selects the one or more third-party routes as the destination route for the first node. Performing the randomized node movement can include inserting the first node into the first third-party delivery route of the one or more third-party delivery routes if the cost differential of removing the first node from the source route and inserting the first node into the first third-party delivery route satisfies a predetermined cost differential level. The one or more storage modules also can be configured to run on the one or more processing modules and perform the act of communicating the first order to a first third-party deliverer associated with the first third-party delivery route for delivery at the first location if the cost differential of removing the first node from the source route and inserting the first node into the first third-party delivery route satisfies the predetermined cost differential level.

Various embodiments include a method. The method can include receiving a plurality of website orders on a website of an online retailer for delivery of a plurality of products. The method also can include determining at least one fleet delivery route for delivery of the plurality of products of the plurality of website orders to a plurality of locations using a vehicle fleet of the online retailer. The at least one fleet delivery route can comprise a plurality of nodes and each node of the plurality of nodes comprises a different location of the plurality of locations. The method also can include performing a randomized node movement on the at least one fleet delivery route to optimize delivery of the plurality of products. Performing the randomized node movement can include selecting a source route from the at least one fleet delivery route using a random number generator. Performing the randomized node movement also can include selecting a first node of the plurality of nodes from the source route as selected with the random number generator, the first node being associated with a first order of the plurality of website orders at a first location of the plurality of locations. Performing the randomized node movement also can include selecting a destination route from the at least one fleet delivery route and one or more third-party delivery routes using the random number generator. Performing the randomized node movement also can include evaluating a cost differential of removing the first node from the source route as selected and inserting the first node into a first third-party delivery route of the one or more third-party delivery routes if the random number generator selects the one or more third-party routes as the destination route for the first node. Performing the randomized node movement also can include inserting the first node into the first third-party delivery route of the one or more third-party delivery routes if the cost differential of removing the first node from the source route and inserting the first node into the first third-party delivery route satisfies a predetermined cost differential level. The method also can include communicating the first order to a first third-party deliverer associated with the first third-party delivery route for delivery at the first location if the cost differential of removing the first node from the source route and inserting the first node into the first third-party delivery route satisfies the predetermined cost differential level.

Figure 2:
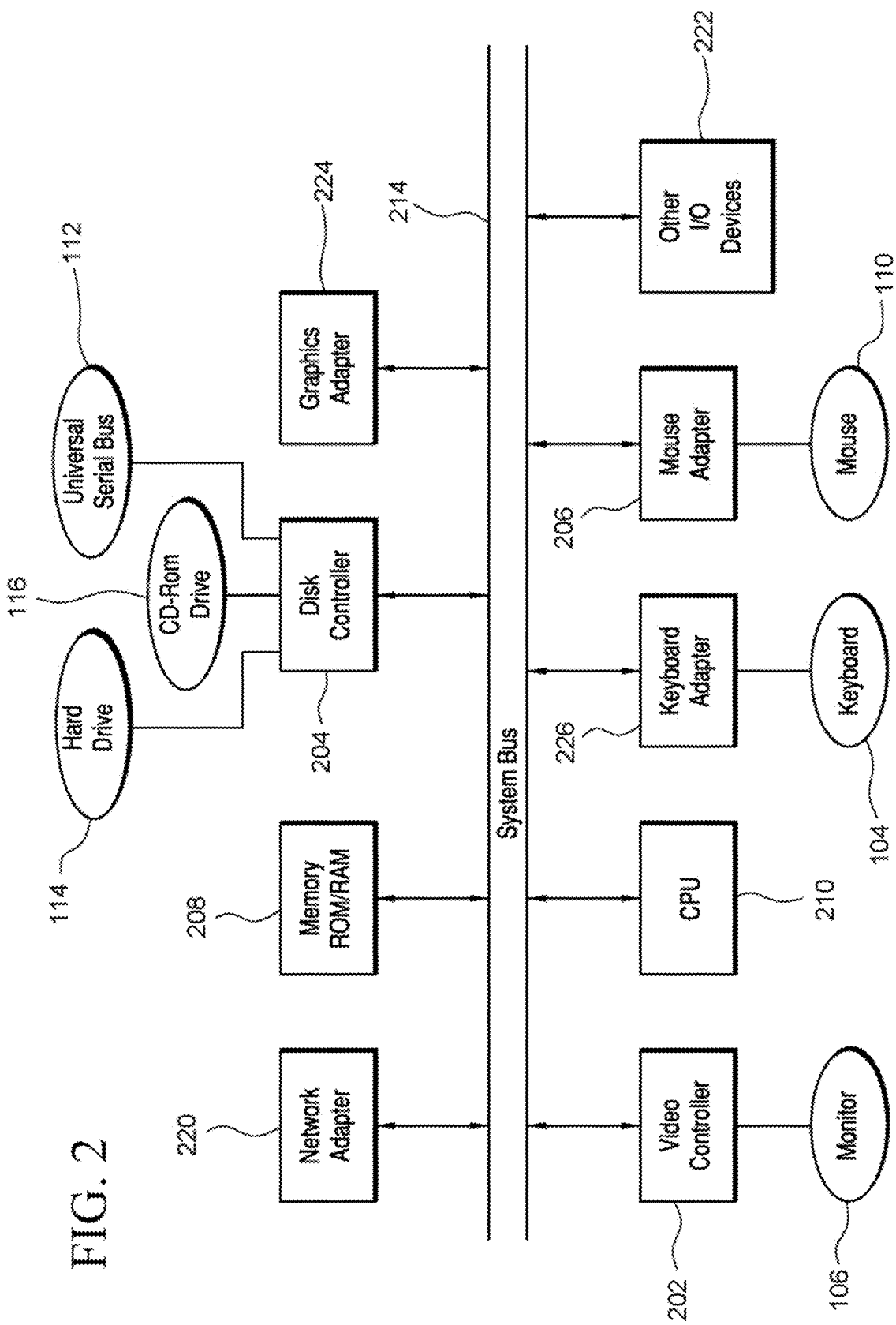
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) volatile (e.g., transitory) memory, such as, for example, read only memory (ROM) and/or (ii) non-volatile (e.g., non-transitory) memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. The memory storage module(s) of the various embodiments disclosed herein can comprise memory storage unit 208, an external memory storage drive (not shown), such as, for example, a USB-equipped electronic memory storage drive coupled to universal serial bus (USB) port 112 (FIGS. 1-2), hard drive 114 (FIGS. 1-2), a CD-ROM and/or DVD for use with CD-ROM and/or DVD drive 116 (FIGS. 1-2), a floppy disk for use with a floppy disk drive (not shown), an optical disc (not shown), a magneto-optical disc (now shown), magnetic tape (not shown), etc. Further, non-volatile or non-transitory memory storage module(s) refer to the portions of the memory storage module(s) that are non-volatile (e.g., non-transitory) memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
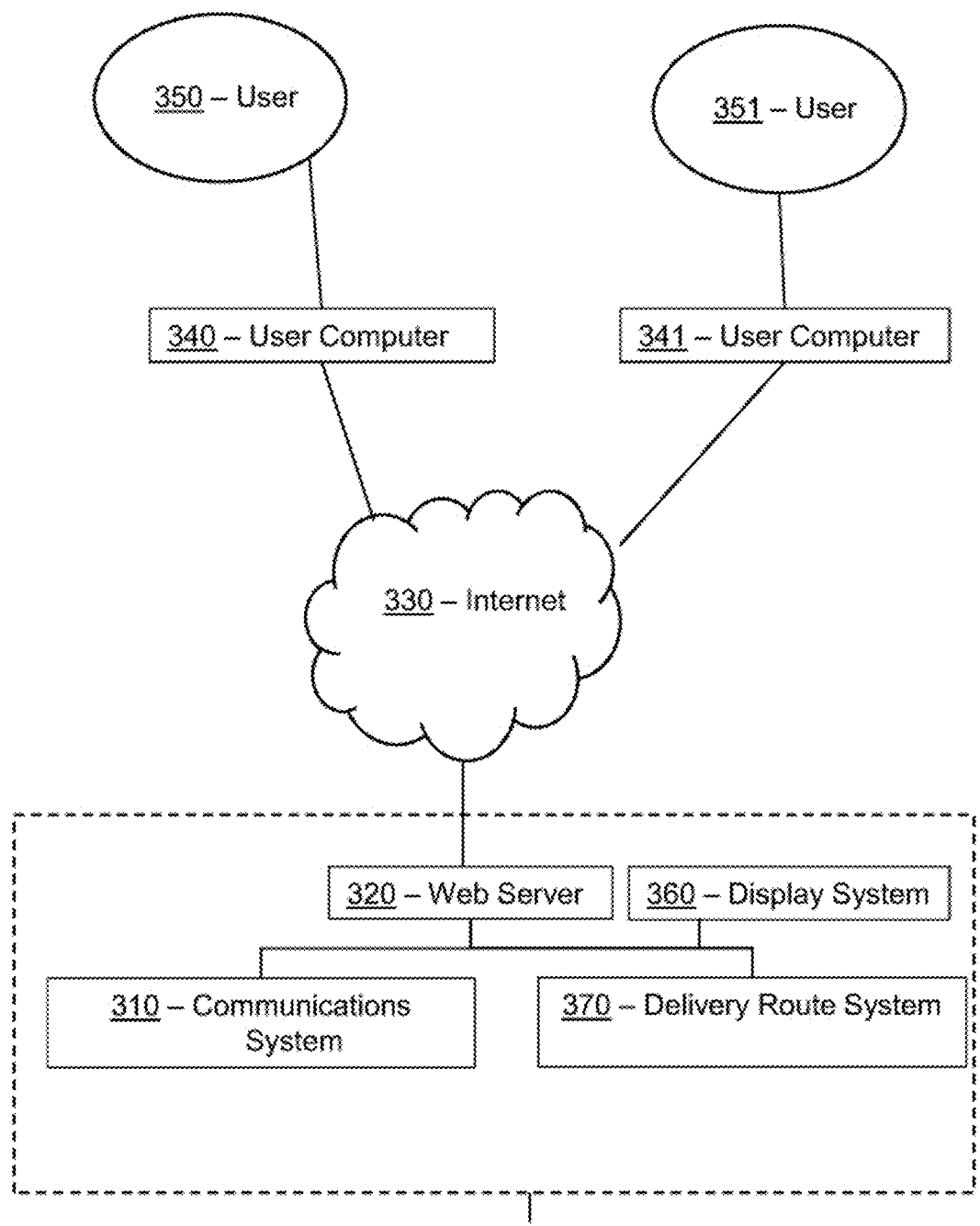
FIG. 3 illustrates a representative block diagram of a system, according to an embodiment.

Turning ahead in the drawings, FIG. 3 illustrates a block diagram of a system 300 that can be employed for optimizing delivery routes using fleet vehicles and third-party deliverers as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a communications system 310, a web server 320, a display system 360, and/or a delivery route system 370. Communications system 310, web server 320, display system 360, and/or delivery route system 370 can each be a computer system, such as computer system 100 (FIG. 1), as described above, and can each be a single computer, a single server, or a cluster or collection of computers or servers, or a cloud of computers or servers. In another embodiment, a single computer system can host each of two or more of communications system 310, web server 320, display system 360, and/or delivery route system 370. Additional details regarding communications system 310, web server 320, display system 360, and/or delivery route system 370 are described herein.

In many embodiments, system 300 also can comprise user computers 340, 341. In some embodiments, user computers 340, 341 can be a mobile device. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i)

the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In some embodiments, web server 320 can be in data communication through Internet 330 with user computers (e.g., 340, 341). In certain embodiments, user computers 340-341 can be desktop computers, laptop computers, smart phones, tablet devices, and/or other endpoint devices. Web server 320 can host one or more websites. For example, web server 320 can host an eCommerce web site that allows users to browse and/or search for products, to add products to an electronic shopping cart, and/or to purchase products, in addition to other suitable activities.

In many embodiments, communications system 310, web server 320, display system 360, and/or delivery route system 370 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) communications system 310, web server 320, display system 360, and/or delivery route system 370 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of communications system 310, web server 320, display system 360, and/or delivery route system 370. In a similar manner, the processing module(s) and the memory storage module(s) can be local and/or remote to each other.

In many embodiments, communications system 310, web server 320, display system 360, and/or delivery route system 370 can be configured to communicate with one or more user computers 340 and 341. In some embodiments, user computers 340 and 341 also can be referred to as customer computers. In some embodiments, communications system 310, web server 320, display system 360, and/or delivery route system 370 can communicate or interface (e.g., interact) with one or more customer computers (such as user computers 340 and 341) through a network or internet 330. Internet 330 can be an intranet that is not open to the public. Accordingly, in many embodiments, communications system 310, web server 320, display system 360, and/or delivery route system 370 (and/or the software used by such systems) can refer to a back end of system 300 operated by an operator and/or administrator of system 300, and user computers 340 and 341 (and/or the software used by such systems) can refer to a front end of system 300 used by one or more users 350 and 351, respectively. In some embodiments, users 350 and 351 also can be referred to as customers, in which case, user computers 340 and 341 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, communications system 310, web server 320, display system 360, and/or delivery route system 370 also can be configured to communicate with one or more databases. The one or more databases can comprise a product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between communications system 310, web server 320, display system 360, and/or delivery route system 370, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

Figure 4A:
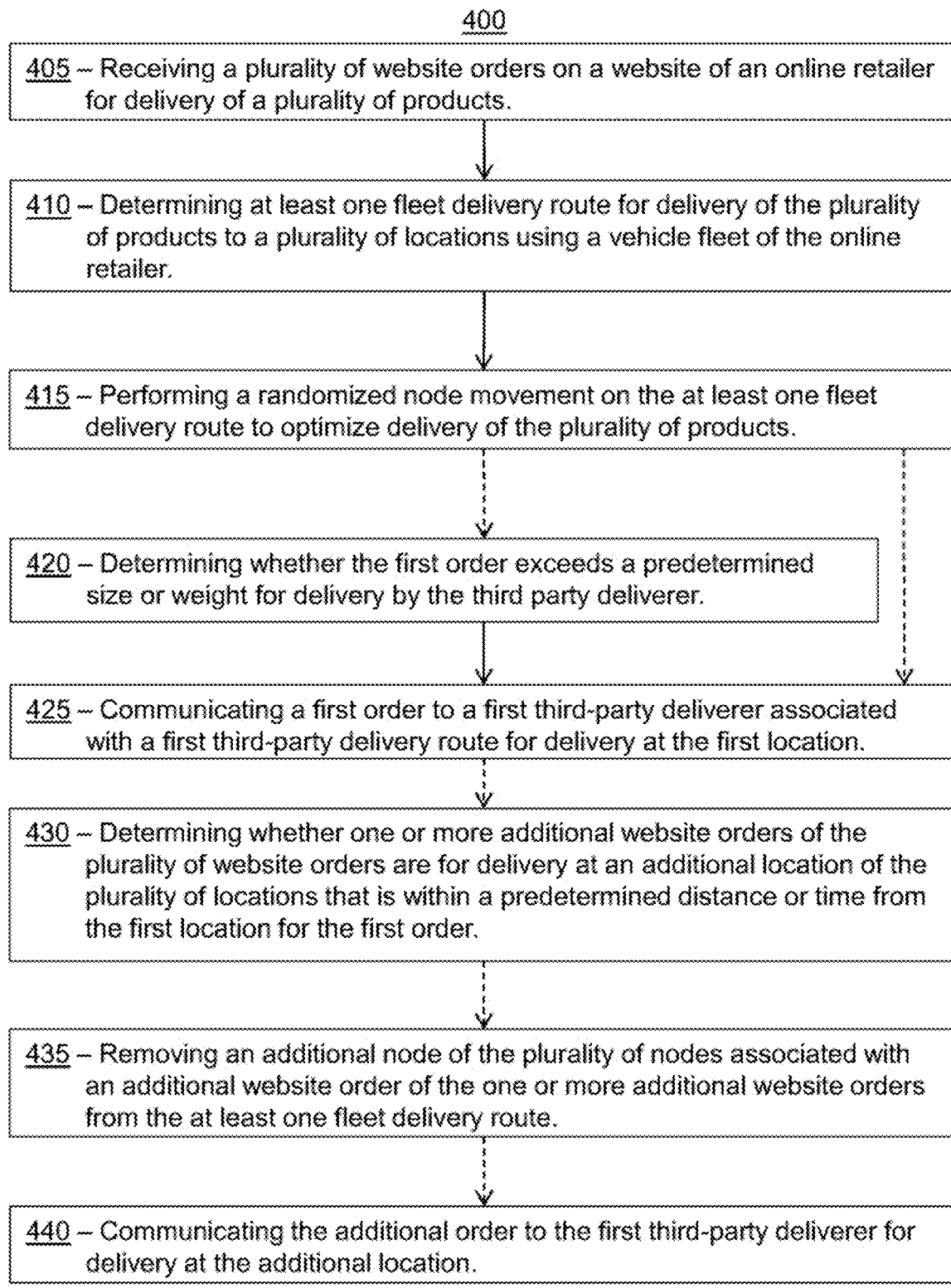
Figure 5:
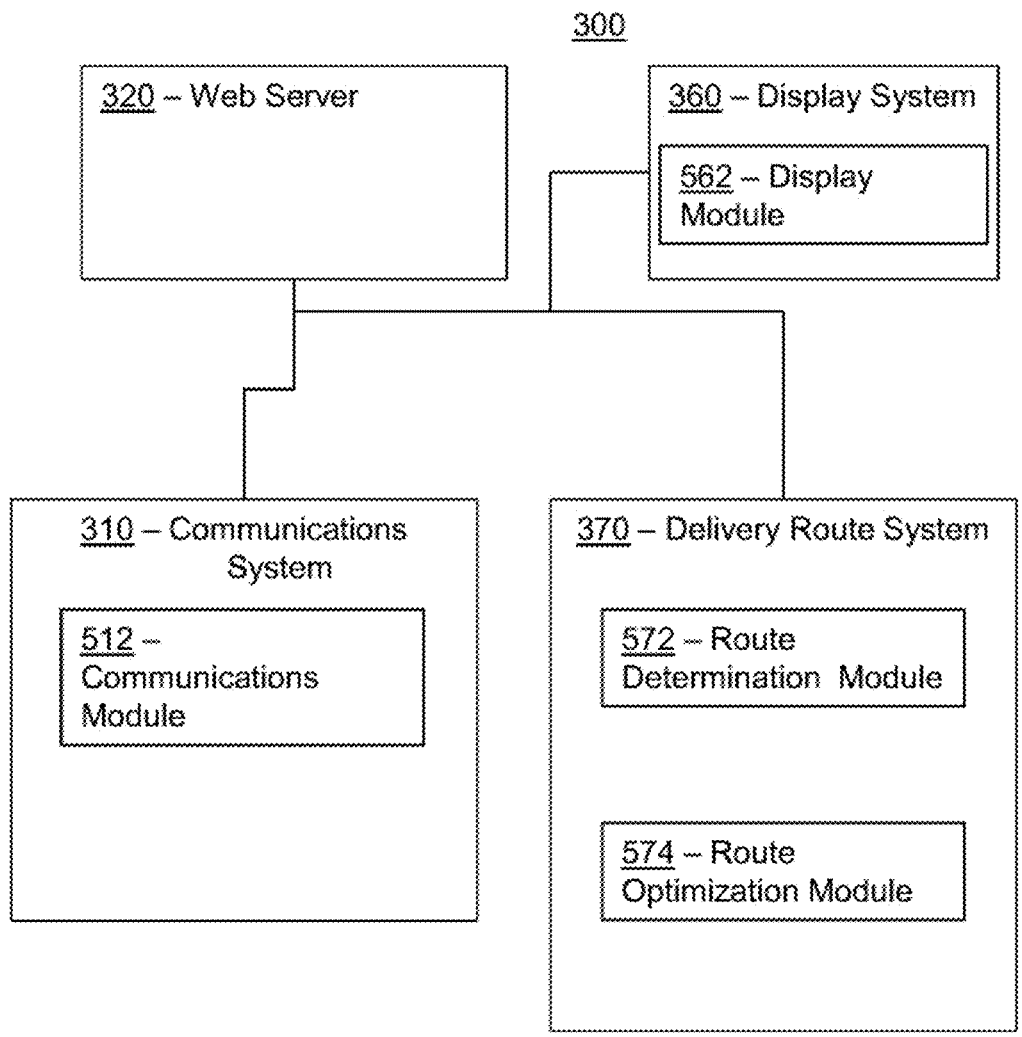
FIG. 5 illustrates a representative block diagram of a portion of the system of FIG. 3, according to an embodiment.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules 512, 562, 572, and/or 574 (FIG. 5). Such non-transitory memory storage modules can be part of a computer system such as communications system 310, web server 320, display system 360, and/or delivery route system 370 (FIGS. 3 & 5). The processing module(s) can be similar or identical to the processing module(s) described above with respect to computer system 100 (FIG. 1).

Method 400 can comprise an activity 405 of receiving a plurality of website orders on a website of an online retailer for delivery of a plurality of products. The plurality of orders can be made by one or more consumers on the website of the online retailer. For example, through one or more RESTful application program interfaces (API), system 300 (FIG. 3) can coordinate a display of one or more view order slots, one or more book order slots, one or more update order slots, and one or more cancel order slots on the web site of the online retailer that allow a consumer to make, update, and/or cancel an order on the web site of the online retailer. System 300 (FIG. 3) can be further configured to determine and coordinate a display of the cost of delivery at different dates and/or times for an order to a customer. In other embodiments, a method can comprise an activity receiving one or more orders from a brick and mortar retail location of the online retailer.

Returning to FIG. 4, method 400 can further comprise an activity 410 of determining at least one fleet delivery route for delivery of the plurality of products to a plurality of locations using a vehicle fleet of the online retailer. In some embodiments, the at least one fleet delivery route can comprise a plurality of nodes, and each node of the plurality of nodes can comprise a different location of the plurality of locations. In more particular embodiments, activity 410 can comprise determining a first fleet delivery route and at least a second fleet delivery route for delivery of the plurality of products of the plurality of web site orders to the plurality of locations using the vehicle fleet of the online retailer. In these embodiments, the first fleet delivery route can comprise a first portion of the plurality of nodes, and the at least the second fleet delivery route can comprise a second portion of the plurality of nodes. Other embodiments can comprise determining any number of fleet delivery routes each comprise a portion of the plurality of nodes.

Activity 410 of determining the at least one fleet delivery route for delivery of the plurality of products also can comprise using a heuristic greedy insertion algorithm to determine the at least one fleet delivery route for delivery of the plurality of products of the plurality of web site orders to the plurality of locations using the vehicle fleet of the online retailer. Preparing delivery routes for a vehicle fleet can be a complicated problem evolved from a traveling salesman problem (TSP), a multiple traveling salesman problem (MTSP), a capacitated vehicle routing problem (CVRP), and/or a vehicle routing problem with time windows (VRPTW). The VRPTW problem is complicated by a limited number of vehicles, the time windows for delivery by the vehicles, multiple trips per shift for the vehicles, breaks, and non-Euclidean driving distance and time between locations of the delivery route. As such, delivery route problems of VRPTW, CVRP, and MTSP can be classified as nondeterministic polynomial (NP) hard. The heuristic greedy insertion algorithm can be used to optimize the one or more delivery routes and overcome these problems. In some embodiments, the heuristic greedy insertion algorithm is concerned only with a time cost, and not a distance cost.

Activity 410 of determining the at least one fleet delivery route for delivery of the plurality of products also can comprise determining average driving times and/or distances from a delivery origination (such as a warehouse or store) to locations of the orders and/or average driving times and/or distances between locations of the orders in a single delivery route.

In some embodiments, the online retailer can receive a route plan or schedule, through portal APIs of system 300 (FIG. 3). Determining the at least one fleet delivery route can be based on delivery route shifts for the fleet vehicle(s) and/or one or more third-party deliverers entered into system 300 (FIG. 3). In some embodiments, after or simultaneously with activity 410, method 400 can comprise an activity of preparing a delivery manifest for each fleet delivery route. The delivery manifest can comprise, for each order of a fleet delivery route, a drop number, an order number, a name for each order, an address, a delivery time and instructions, a customer identification number, a number of previous orders by the customer, a number previous complains by the customer, a complaint percentage by the customer, a telephone number for the customer, an order weight, an order size, an order value, a fragility indicator and/or temperature sensitivity indicator of the item(s) being delivered, and/or a door step time. Similar delivery manifests can be prepared for third-party deliverers when selected, as described below. The vehicle fleet of the online retailer can comprise any of a number of different vehicles, such as but not limited to cars, trucks, vans, motorcycles, bicycles, unmanned aerial vehicles (UAV), self-driving cars, etc.

Method 400 can further comprise an activity 415 of performing a randomized node movement on the at least one fleet delivery route to optimize delivery of the plurality of products. In embodiments comprising at least two fleet delivery routes, activity 415 can comprise performing the randomized node movement on at least one of the first fleet delivery route and the at least the second fleet delivery route to optimize delivery of the plurality of products. In some embodiments, performing the randomized node movement can comprise using a learning management system (LMS). By performing the randomized node movement on the at least one fleet delivery route, a pool of delivery routes is no longer fixed, but rather the pool of delivery routes is dynamic. Activity 415 can comprise a number of activities to perform the randomized nodes movement, as shown in the flowchart of FIG. 4B.

Turning ahead in the drawings to FIG. 4B, activity 415 can optionally comprise activity 455 of selecting a source route from the at least one fleet delivery route. In embodiments comprising at least two fleet delivery routes, activity 415 can comprise selecting the source route from the first fleet delivery route and the at least the second fleet delivery route. In some embodiments, a random number generator can be used to select the source route from the at least one fleet delivery route. For example, each route of the at least one fleet delivery route can be assigned a number, and a random number generator can select from the numbers assigned to each route of the at least one run fleet delivery route to select a source route.

Activity 415 can further comprise an activity 460 of selecting a first node from the source route as selected with the random number generator. The first node can be associated with a first order of the plurality of website orders at a first location of the plurality of locations. For example, each node of the source route can be assigned a number, and a random number generator can select from the numbers assigned to the nodes in the source route to select the first node.

Activity 415 can further comprise an activity 465 of selecting a destination route from the at least one fleet delivery route and one or more third-party delivery routes using the random number generator. In embodiments comprising at least two fleet delivery routes, activity 465 can comprise selecting the destination route from the first fleet delivery route, the at least the second fleet delivery route, and the one or more third-party delivery routes using the random number generator. For example, each delivery route of the at least one fleet delivery route and the one or more third-party delivery routes can be assigned a number, and a random number generator can select from the numbers assigned to the delivery routes of the at least one fleet delivery route and the one or more third-party delivery routes to select the destination route.

In some embodiments, the first third-party deliverer or any other third-party delivery reference herein can comprise a commercial delivery service or a crowdsourced deliverer. For example, a third party deliverer can comprise any of a number of different vehicles operated by a third-party not associated with the online retailer, such as but not limited to cars, trucks, vans, motorcycles, bicycles, UAV, self-driving cars, taxis, etc. In some embodiments, a third-party deliverer can comprise an online transportation network such as but not limited to commercial services like LIBER® services, LYFT® services, etc.

In some embodiments, the one or more third-party routes can comprise a potential new third-party route that will be created if a third-party deliverer is selected for the destination route. Thus, the one or more third-party routes can comprise an empty delivery route prior to being selected as the destination route. In other embodiments, the one or more third-party routes can each comprise at least one node for at least one order before being selected as the destination route. For example, in some embodiments, the one or more third-party delivery routes comprise a plurality of third-party delivery routes for a plurality of third-party deliverers. Thus, in some embodiments, activity 415 can optionally comprise an activity of selecting the first third-party delivery route associated with the first third-party deliverer of the plurality of third-party deliverers from the plurality of third-party delivery routes with the random number generator.

By way of a non-limiting example, a third-party delivery route can be selected as the destination route using the random number generator. After a third-party delivery route is selected as the destination route, the random number generator can select a third-party deliverer from a plurality of third-party deliverer for delivery of the first order. Alternatively, system 300 can automatically determine one third-party deliverer from a plurality of third-party deliverers based on costs and/or availability of the third-party deliverers if the one or more third-party delivery routes are selected by the random number generator. In still other embodiments, each of the plurality of third-party deliverers can be represented by a different third-party delivery route when the destination route is selected using the random number generator. That is, the random number generator can select the destination route from at least one fleet delivery route, a first third-party delivery route associated with a first third-party deliverer, and at least a second third-party delivery route associated with at least a second third party deliverer.

Activity 415 can further comprise an activity 470 of evaluating a cost differential of removing the first node from the source route and inserting the first node into a first third-party delivery route. More particularly, activity 470 can comprise evaluating the cost differential of removing the first node from the source route as selected and inserting the first node into the first third-party delivery route of the one or more third-party delivery routes if the random number generator selects the one or more third-party routes as the destination route for the first node. Evaluating a cost differential of removing the first node from the source route and inserting the first node into the first third-party delivery route can comprise determining whether or not delivery of the first order associated with the first node by a third-party deliverer will be less expensive for the online retailer than delivery of the first order by a vehicle of the vehicle fleet of the online retailer. Alternatively, evaluating a cost differential of removing the first node from the source route and inserting the first node into the first third-party delivery route can comprise determining whether or not delivery of the first order associated with the first node by a third-party deliverer will be quicker for the online retailer than delivery of the first order by a vehicle of the vehicle fleet of the online retailer. In still other embodiments, evaluating a cost differential of removing the first node from the source route and inserting the first node into the first third-party delivery route can comprise determining whether or not delivery of the first order associated with the first node by a third-party deliverer will be more expensive and/or less expensive for the online retailer than delivery of the first order by a vehicle of the vehicle fleet of the online retailer.

In some embodiments, activity 415 also can comprise performing one or more simulated annealings to compare an initial cost of leaving the first node in the source route versus a final cost of removing the first node from the source route and inserting the first node into the first third-party delivery route. Performing the one or more simulated annealings can comprise generating an initial temperature $T_0$ for an initial cost of leaving the first node in the source route by multiplying the initial cost of leaving the first node in the source route and a parameter $\gamma$, where $\gamma$ is a preconfigured constant value. Thus, $T_0 = \text{initial\_solution\_cost} \times \gamma$. If a final cost of removing the first node from the source route and inserting the first node into the first third-party delivery route is less than the initial cost of leaving the first node in the source route, then the solution of removing the first node from the source route and inserting the first node into the first third-party delivery route is accepted. If, however, the final cost of removing the first node from the source route and inserting the first node into the first third-party delivery route is not less than the initial cost of leaving the first node in the source route, the system 300 (FIG. 3) can compare a randomly generated number between 0 and 1 with an acceptance probability $T/(T+\Delta)$, where $\Delta$ is a preconfigured constant value and $T$ is a temperature of the current optimization iteration. $T$ can be updated at the end of each iteration with $T_{next} = T_{current} \times \beta$, where $\beta$ is a constant value between 0 and 1 that is used to reduce temperature $T$ at the end of each iteration.

If the random number is smaller than the acceptance probability, then the solution of removing the first node from the source route and inserting the first node into the first third-party delivery route is still accepted. If, however, the random number is not smaller than the acceptance probability, then the solution of removing the first node from the source route and inserting the first node into the first third-party delivery route is rejected. At the end of each iteration of evaluating a cost differential, the system cools down the temperature $T$ by a percentage of $\beta$. This process can be repeated with any number of new solutions and new final costs to compare to the initial cost. After going through a number of random iterations of node movements as described above, the acceptance probability acceptance probability $T/(T+\Delta)$ will be approximating to 0, which essentially enforces a rejection of every worse solution. In some embodiments, $T$ is not tied to any specific solution, and can instead be tied to each optimization iteration. For example, a new solution and an old solution can share the same temperature as long as the new solution is generated within the same iteration of the old solution. On the other hand side, if the new solution is the very first solution generated in a new iteration, the new solution can include a new temperature. The new temperature should be lower than the temperature of the previous iteration.

Costs considered in evaluating the costs can comprise hard costs and soft costs for the vehicle fleet and the third-party deliverer. Hard costs can comprise mileage costs and/or labor costs. Mileage costs can comprise a variable cost that is charged at a dollar/mile rate. Labor costs can comprise a fixed cost that is charged when shifts are planned, a semi-fixed cost charged when a shift is used, and a variable cost charged at dollar/minute or dollar/hour rate. The mileage cost, semi-fixed labor cost, and the variable cost labor cost can be optimized in some embodiments. Soft costs can comprise unsuccessful order costs, late delivery costs, and/or late return to depot costs. All costs can be listed as costs for the online retailer, even if the costs are associated with a third-party deliverer.

Returning to FIG. 4B, activity 415 can further comprise an activity 475 of inserting the first node into the first third-party delivery route of the one or more third-party delivery routes. More particularly, activity 475 can comprise inserting the first node into the first third-party delivery route of the one or more third-party delivery routes if the cost differential of removing the first node from the source route and inserting the first node into the first third-party delivery route satisfies a predetermined cost differential level. For example, the insertion of the first node into the first third-party delivery route can meet or exceed a minimum predetermined cost and/or time savings for the online retailer.

Returning to FIG. 4A in the drawings, after activity 415, method 400 can optionally comprise an activity 420 of determining whether the first order exceeds a predetermined size or weight for delivery by the third party deliverer associated with the first third-party delivery route. In some embodiments, a third-party deliverer can have size or weight restriction for products that are to be delivered. For example, some products can be too big to fit in the car of the third-party deliverer, or can be too heavy for the driver of the third-party deliverer to safely deliver. In still other embodiments, the online retailer may prefer that products exceeding certain sizes, weights, and/or monetary values should be delivered only by the vehicle fleet of the online retailer. Thus, the system can determine whether the product(s) of the first order exceed a predetermined size, weight, and/or value for delivery with the first third-party delivery route of the first third-party deliverer. In some embodiments, then, method 400 can comprise an activity of re-selecting the destination route for the first order from only the at least one fleet delivery route with the random number generator if the random number generator selects the one or more third-party routes as the destination route for the first node and if the first order exceeds the predetermined size or weight for delivery by the one or more third-party deliverers.

After activity 415 and/or 420, method 400 can optionally comprise an activity 425 of communicating a first order to a first third-party deliverer associated with a first third-party delivery route for delivery at the first location. In some embodiments, activity 425 can comprise communicating the first order to the first third-party deliverer associated with the first third-party delivery route for delivery at the first location if the cost differential of removing the first node from the source route and inserting the first node into the first third-party delivery route satisfies the predetermined cost differential level.

Next, method 400 can optionally comprise an activity 430 of determining whether one or more additional website orders of the plurality of website orders are for delivery at an additional location of the plurality of locations that is within a predetermined distance or time from the first location for the first order. If the additional location is within the predetermined distance or time from the first location for the first order, then method 400 also can optionally comprise an activity 435 of removing an additional node of the plurality of nodes associated with an additional website order of the one or more additional website orders from the at least one fleet delivery route. Method 400 can then optionally comprise an activity 440 of communicating the additional order to the first third-party deliverer for delivery at the additional location.

It is further noted that, advantageously, the acts of receiving the plurality of website orders, determining the at least one fleet delivery route, performing the randomized node movement, and communicating the first order to the first third-party deliverer are performed in real-time. In some embodiments, determining the at least one fleet route also can be performed in real time with the acts of receiving the plurality of website orders, determining the at least one fleet delivery route, performing the randomized node movement, and communicating the first order to the first third-party deliverer.

FIG. 5 illustrates a block diagram of a portion of system 300 comprising communications system 310, web server 320, display system 360, and delivery route system 370, according to the embodiment shown in FIG. 3. Each of communications system 310, web server 320, display system 360, and delivery route system 370, is merely exemplary and not limited to the embodiments presented herein. Each of communications system 310, web server 320, display system 360, and/or delivery route system 370, can be employed in many different embodiments or examples not specifically depicted or described herein. In some embodiments, certain elements or modules of communications system 310, web server 320, display system 360, and/or delivery route system 370, can perform various procedures, processes, and/or acts. In other embodiments, the procedures, processes, and/or acts can be performed by other suitable elements or modules.

In many embodiments, parameter optimization system 310 can comprise non-transitory memory storage module 512. Memory storage module 512 can be referred to as communications module 512. In many embodiments, communications module 512 can store computing instructions configured to run on one or more processing modules and perform one or more acts of method 400 (FIGS. 4A-B) (e.g., activity 405 of receiving a plurality of website orders on a website of an online retailer for delivery of a plurality of products (FIG. 4A), activity 425 of communicating a first order to a first third-party deliverer associated with a first third-party delivery route for delivery at the first location (FIG. 4A), and activity 440 of communicating the additional order to the first third-party deliverer for delivery at the additional location (FIG. 4A)).

In many embodiments, display system 360 can comprise non-transitory memory storage module 562. Memory storage module 562 can be referred to as display module 562. In many embodiments, display module 562 can store computing instructions configured to run on one or more processing modules and perform one or more acts of method 400 (e.g., an activity of coordinating a display of one or more view order slots, one or more book order slots, one or more update order slots, and one or more cancel order slots on the web site of the online retailer that allow a consumer to make, update, and/or cancel an order on the website of the online retailer).

In many embodiments, delivery route system 370 can comprise non-transitory memory storage modules 572 and 574. Memory storage module 572 can be referred to as route determination module 572. In many embodiments, route determination module 572 can store computing instructions configured to run on one or more processing modules and perform one or more acts of method 400 (FIGS. 4A & 4B) (e.g., activity 410 of determining at least one fleet delivery route for delivery of the plurality of products to a plurality of locations using a vehicle fleet of the online retailer (FIG. 4A), and activity 430 of determining whether one or more additional website orders of the plurality of website orders are for delivery at an additional location of the plurality of locations that is within a predetermined distance or time from the first location for the first order (FIG. 4A)).

Memory storage module 574 can be referred to as route optimization module 574. In many embodiments, route optimization module 574 can store computing instructions configured to run on one or more processing modules and perform one or more acts of method 400 (FIGS. 4A & 4B) (e.g., activity 435 of removing an additional node of the plurality of nodes associated with an additional website order of the one or more additional website orders from the at least one fleet delivery route (FIG. 4A), activity 420 of determining whether the first order exceeds a predetermined size or weight for delivery by the third party deliverer (FIG. 4A), and/or activity 415 of performing a randomized node movement on the at least one fleet delivery route to optimize delivery of the plurality of products (FIG. 4A), which activity can comprise activity 455 of selecting a source route from the at least one fleet delivery route (FIG. 4B), activity 460 of selecting a first node from the source route as selected with the random number generator (FIG. 4B), activity 465 of selecting a destination route from the at least one fleet delivery route and one or more third-party delivery routes using the random number generator (FIG. 4B), activity 470 of evaluating a cost differential of removing the first node from the source route and inserting the first node into a first third-party delivery route (FIG. 4B), and/or activity 475 of inserting the first node into the first third-party delivery route of the one or more third-party delivery routes (FIG. 4B)).

Although optimizing delivery routes using fleet vehicles and third-party deliverers has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-5 may be modified, and that the foregoing discussion of certain of these embodiments does not necessarily represent a complete description of all possible embodiments. For example, one or more of the procedures, processes, or activities of FIGS. 4A-B may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   one or more processors; and
   one or more non-transitory computer-readable media storing computing instructions that, when executed on the one or more processors, cause the one or more processors to perform functions comprising:
      receiving one or more orders for delivery of one or more items;
      determining at least one fleet delivery route for delivery of the one or more items of the one or more orders to one or more locations using a vehicle fleet;
      dynamically shuffling the at least one fleet delivery route, wherein dynamically shuffling the at least one fleet delivery route comprises:
         selecting a source route from the at least one fleet delivery route;
         selecting a first order of the one or more orders from the source route, wherein the first order is scheduled to be delivered to a first location of the one or more locations;
         evaluating a cost differential of removing the first order of the one or more orders from the source route, as selected; and
         inserting the first order into a first other delivery route of one or more other delivery routes when (1) removing the first order from the source route and (2) inserting the first order into the first other delivery route satisfies a predetermined cost differential level; and
      communicating the first order to a first other deliverer associated with the first other delivery route for delivery at the first location when (1) removing the first order from the source route and (2) inserting the first order into the first other delivery route satisfies the predetermined cost differential level.

2. The system of claim 1, wherein:
   determining the at least one fleet delivery route for delivery of the one or more items comprises determining a first fleet delivery route and at least a second fleet delivery route for delivery of the one or more items of the one or more orders to the one or more locations using the vehicle fleet;
   dynamically shuffling the at least one fleet delivery route further comprises performing a randomized node movement on the first fleet delivery route and the at least the second fleet delivery route; and
   selecting the source route from the at least one fleet delivery route comprises selecting the source route from the first fleet delivery route and the at least the second fleet delivery route.

3. The system of claim 1, wherein:
   the one or more other delivery routes comprise one or more other delivery routes for one or more other deliverers comprising at least the first other deliverer; and
   dynamically shuffling further comprises selecting the first other delivery route associated with the first other deliverer of the one or more other deliverers from the one or more other delivery routes with a random number generator.

4. The system of claim 1, wherein the computing instructions, when executed on the one or more processors, further cause the one or more processors to perform functions comprising:
   determining whether one or more additional orders of the one or more orders are for delivery at an additional location of the one or more locations that is within a predetermined distance or time from the first location for the first order;
   removing an additional order of the one or more additional orders from the at least one fleet delivery route; and
   communicating the one or more additional orders to the first other deliverer for delivery at the additional location.

5. The system of claim 1, wherein the first other deliverer comprises a commercial delivery service or a crowdsourced delivery service.

6. The system of claim 1, wherein determining the at least one fleet delivery route for delivery of the one or more items comprises using a heuristic greedy insertion algorithm to determine the at least one fleet delivery route for delivery of the one or more items of the one or more orders to the one or more locations using the vehicle fleet.

7. The system of claim 1, wherein receiving the one or more orders, determining the at least one fleet delivery route, dynamically shuffling, and communicating the first order to the first other deliverer are performed in real-time.

8. The system of claim 1, wherein:
   the at least one fleet delivery route comprises a plurality of nodes; and
   each node of the plurality of nodes comprises a different location of the one or more locations.

9. The system of claim 8, wherein inserting the first order into the first other delivery route of the one or more other delivery routes comprises:
    inserting a first node of the plurality of nodes into the first other delivery route of the one or more other delivery routes when (1) removing the first node from the source route and (2) inserting the first node into the first other delivery route satisfies the predetermined cost differential level.

10. A method being implemented via execution of computing instructions configured to run on one or more processors and stored at one or more non-transitory computer-readable media, the method comprising:
    receiving one or more orders for delivery of one or more items;
    determining at least one fleet delivery route for delivery of the one or more items of the one or more orders to one or more locations using a vehicle fleet;
    dynamically shuffling the at least one fleet delivery route, wherein dynamically shuffling the at least one fleet delivery route comprises:
        selecting a source route from the at least one fleet delivery route;
        selecting a first order of the one or more orders from the source route, wherein the first order is scheduled to be delivered to a first location of the one or more locations;
        evaluating a cost differential of removing the first order of the one or more orders from the source route, as selected; and
        inserting the first order into a first other delivery route of one or more other delivery routes when (1) removing the first order from the source route and (2) inserting the first order into the first other delivery route satisfies a predetermined cost differential level; and
    communicating the first order to a first other deliverer associated with the first other delivery route for delivery at the first location when (1) removing the first order from the source route and (2) inserting the first order into the first other delivery route satisfies the predetermined cost differential level.

11. The method of claim 10, wherein:
    determining the at least one fleet delivery route for delivery of the one or more items comprises determining a first fleet delivery route and at least a second fleet delivery route for delivery of the one or more items of the one or more orders to the one or more locations using the vehicle fleet;
    dynamically shuffling the at least one fleet delivery route further comprises performing a randomized node movement on the first fleet delivery route and the at least the second fleet delivery route; and
    selecting the source route from the at least one fleet delivery route comprises selecting the source route from the first fleet delivery route and the at least the second fleet delivery route.

12. The method of claim 10, wherein:
    the one or more other delivery routes comprise one or more other delivery routes for one or more other deliverers comprising at least the first other deliverer; and
    dynamically shuffling further comprises selecting the first other delivery route associated with the first other deliverer of the one or more other deliverers from the one or more other delivery routes with a random number generator.

13. The method of claim 10, further comprising:
    determining whether one or more additional orders of the one or more orders are for delivery at an additional location of the one or more locations that is within a predetermined distance or time from the first location for the first order;
    removing an additional order of the one or more additional orders from the at least one fleet delivery route; and
    communicating the one or more additional orders to the first other deliverer for delivery at the additional location.

14. The method of claim 10, wherein the first other deliverer comprises a commercial delivery service or a crowdsourced delivery service.

15. The method of claim 10, wherein determining the at least one fleet delivery route for delivery of the one or more items comprises using a heuristic greedy insertion algorithm to determine the at least one fleet delivery route for delivery of the one or more items of the one or more orders to the one or more locations using the vehicle fleet.

16. The method of claim 10, wherein receiving the one or more orders, determining the at least one fleet delivery route, dynamically shuffling, and communicating the first order to the first other deliverer are performed in real-time.

17. The method of claim 10, wherein:
    the at least one fleet delivery route comprises a plurality of nodes; and
    each node of the plurality of nodes comprises a different location of the one or more locations.

18. The method of claim 17, wherein inserting the first order into the first other delivery route of the one or more other delivery routes comprises:
    inserting a first node of the plurality of nodes into the first other delivery route of the one or more other delivery routes when (1) removing the first node from the source route and (2) inserting the first node into the first other delivery route satisfies the predetermined cost differential level.

19. The system of claim 1, wherein evaluating the cost differential comprises using simulated annealing to evaluate the cost differential.

20. The method of claim 10, wherein evaluating the cost differential comprises using simulated annealing to evaluate the cost differential.

* * * * *